(12) United States Patent
Kendall et al.

(10) Patent No.: US 7,805,621 B2
(45) Date of Patent: Sep. 28, 2010

(54) METHOD AND APPARATUS FOR PROVIDING A BUS INTERFACE WITH POWER MANAGEMENT FEATURES

(75) Inventors: Chad Kendall, Burnaby (CA); Scott McDaniel, Villa Park, CA (US); Sunil Pulikkal, Tustin, CA (US)

(73) Assignee: Broadcom Corporation, Irvine, CA (US)

( * ) Notice: Subject to any disclaimer, the term of this patent is extended or adjusted under 35 U.S.C. 154(b) by 985 days.

(21) Appl. No.: 11/540,824

(22) Filed: Sep. 29, 2006

(65) Prior Publication Data

US 2008/0082840 A1    Apr. 3, 2008

(51) Int. Cl.
G06F 1/00 (2006.01)
G06F 1/26 (2006.01)
G06F 1/32 (2006.01)

(52) U.S. Cl. .................. 713/300; 713/320; 713/323; 713/324; 713/330; 326/62; 326/80

(58) Field of Classification Search .............. 713/300, 713/320, 323, 324, 330; 326/62, 82
See application file for complete search history.

(56) References Cited

U.S. PATENT DOCUMENTS 7,188,263 B1 * 3/2007 Rubinstein et al. .......... 713/300
7,313,713 B2 * 12/2007 Weber et al. ................ 713/324

OTHER PUBLICATIONS

Bednar, T R., et al., "Issues and Strategies for the Physical Desing of System-on-a-Chip ASICs", *IBM J. Res. & Dev*, vol. 46, No. 6, (Nov. 2002),661-674.

Dan, Hillman, et al., "Implementing Power Management IP for Dynamic and Static Power Reduction in Configurable Microprocessors Using the Galaxy Design Platform at 130nm", *SNUG*, (2004),15 pages.

Gibbons, Alan, "Rapid Implementation of Low Power ARM Microprocessors", *Information Quarterly*, vol. 4, No. 1, (2005),55-57.

Hu, Jingcao, et al., "Architecting Voltage Islands in Core-Based System-On-A-Chip Designs", *ISLPED*, (Aug. 2004),6 pages.

Lackey, David E., et al., "Managing Power and Performance for System-on-Chip Designs using Voltage Islands", *IEEE*, (2002),8 pgs.

* cited by examiner

*Primary Examiner*—Thomas Lee
*Assistant Examiner*—Michael J Brown
(74) *Attorney, Agent, or Firm*—Brake Hughes Bellermann LLP (57) ABSTRACT

Methods and apparatus for providing a bus interface are disclosed. An example method for providing a bus interface includes operating first circuitry using a first power supply voltage in a normal operating mode, where the first circuitry includes at least a portion of datapath circuitry of the bus interface. The example method further includes powering down the first circuitry in a low power operating mode and operating second circuitry using the first power supply voltage in the normal operating mode. The example method also includes operating the second circuitry using a second power supply voltage in the low power operating mode. The second circuitry includes a power management control circuit adapted to receive a power management event indication signal. Responsive to the power management event indication signal, the control circuit provides at least one of an in-band power management indication and an out-of-band power management indication to one or more devices in a computing system. In the example method, the first and second power supply voltages may be provided by a single power supply or, alternatively, by multiple power supplies.

20 Claims, 8 Drawing Sheets

METHOD AND APPARATUS FOR PROVIDING A BUS INTERFACE WITH POWER MANAGEMENT FEATURES

BACKGROUND

Bus interfaces are used in numerous electronic devices and systems to communicate data from one device to another. For instance, a network interface card may include a bus interface that communicates data (e.g., parallel and/or serial data) with any number of other devices, such as a computer motherboard or system memory, for example. There are a wide range of bus interface protocols and corresponding bus interfaces (e.g., circuits and/or logic) that are implemented in accordance with those bus interface protocols. Some examples of such protocols include the Peripheral Component Interconnect (PCI) protocol, the PCI Express (PCIE) protocol, the Universal Serial Bus (USB) protocol, the HyperTransport protocol and the InfiniBand protocol, among numerous other protocols.

Such bus interfaces may include complex circuitry including hundreds of thousands of logic gates. In certain cases, it may be desirable, at times, to operate a bus interface in a low power mode where certain parts of the circuitry are disabled to conserve dynamic power consumption. When operating in a low power mode, a bus interface may, however, retain some functionality. For instance, a bus interface operating in a low power mode may continue to support management functions, such as power management functions.

As device geometries (e.g., transistor channel lengths) in advanced semiconductor manufacturing processes continue to shrink (e.g., to 90 nm and smaller), leakage current becomes a much larger component of the overall power consumption of circuits implemented using such processes. Further, as use of high speed serial interfaces increases, the speed at which the interface logic for such interfaces operates (e.g., clock speed) also increases. Accordingly, such interfaces are generally implemented using high speed, low voltage threshold (Vt) devices. These low Vt devices have higher leakage current than higher threshold devices, especially on advanced semiconductor processes. With such increases in leakage current, it may be difficult or impossible to meet power consumption specifications for low power operating modes for various bus interface protocols. For example, the PCIE protocol specifies a current limit of 375 mA in the low power mode. On some devices (e.g., those fabricated using advanced semiconductor processes), leakage current for a PCIE bus interface may be on the order of several hundred milliamps and may even exceed the 375 mA current limit without accounting for any dynamic current of the bus interface in the low power operating mode. The high amount of leakage current may, therefore, severally limit the amount of logic in a given device that can be powered during the low power operating mode to provide a user with desired low power operating mode functionality.

The foregoing examples of the related art and limitations related therewith are intended to be illustrative and not exclusive. Other limitations of the related art may become apparent to those of skill in the art upon a reading of the specification and a study of the drawings.

SUMMARY

The following embodiments and aspects thereof are described and illustrated in conjunction with systems, tools and methods, which are given by way of example and meant to be illustrative, not limiting in scope. In various embodiments, one or more of the above-described problems may be reduced or eliminated, while other embodiments may be directed to other improvements.

In an example embodiment, an apparatus for providing a bus interface may include a first power supply bus (e.g., power supply rail). The first power supply bus may be adapted to distribute a first power supply voltage. In the example apparatus, the first power supply bus may be energized during a normal operating mode of the bus interface and not energized during a low power operating mode of the interface.

The example apparatus may further include a second power supply bus. The second power supply bus may be adapted to distribute the first power supply voltage during the normal operating mode. The second power supply bus may also be further adapted to distribute a second power supply voltage during the low power operating mode. Depending on the particular embodiment, the first power supply voltage and the second power supply voltage may be provided using a single power supply or, alternatively, may be provided using multiple power supplies.

The example apparatus may also include first circuitry coupled with the first power supply bus and second circuitry coupled with the second power supply bus. The first circuitry and the second circuitry may be adapted to be powered using the first power supply voltage in the normal operating mode. Further, the first circuitry may be adapted to be powered down (e.g., powered off) in the low power operating mode, while the second circuitry may be adapted to be powered by the second power supply voltage in the lower power operating mode.

In the example apparatus, the first circuitry may include at least a portion of datapath circuitry of the bus interface. Further, the second circuitry may include a power management control circuit. The power management control circuit may be adapted to, in the low power operating mode, receive a power management event indication signal and, responsive to the power management event indication signal, provide at least one of an in-band power management indication and an out-of-band power management indication to one or more devices in a computing system.

An example method of providing a bus interface may include operating first circuitry using a first power supply voltage in a normal operating mode. In the example method, the first circuitry may include at least a portion of datapath circuitry of the bus interface. The example method may further include powering down the first circuitry in a low power operating mode.

The example method may also include operating second circuitry using the first power supply voltage in the normal operating mode and operating the second circuitry using a second power supply voltage in the low power operating mode. In the example method, the second circuitry may include a power management control circuit that is adapted to receive a power management event indication signal. Responsive to the power management event indication signal, the power management control circuit may provide at least one of an in-band power management indication and an out-of-band power management indication to one or more devices in a computing system.

BRIEF DESCRIPTION OF THE DRAWINGS

Example embodiments are illustrated in referenced figures of the drawings. It is intended that the embodiments and figures disclosed herein are to be considered illustrative rather than restrictive.

DETAILED DESCRIPTION

Example Bus Interfaces

Figure 1A:
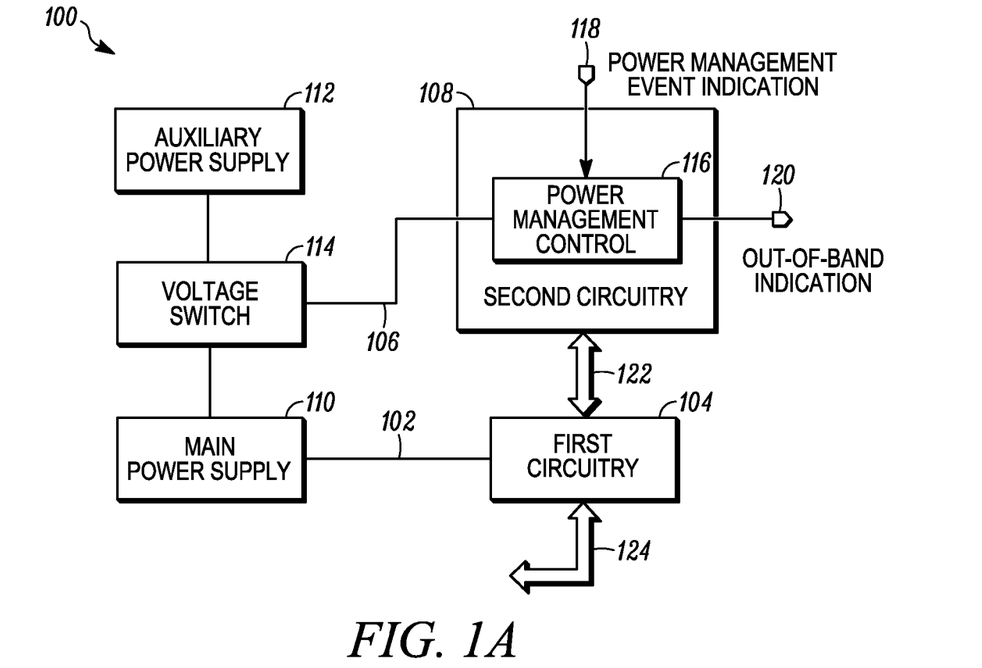
FIG. 1A is a schematic block diagram illustrating an example bus interface.

FIG. 1A is a schematic block, diagram of an example bus interface 100 that may address the current consumption concerns for a low power operating mode. The bus interface 100 includes a first power supply bus 102 that is coupled with first circuitry 104. The first circuitry 104 may implement any number of functions depending on the particular embodiment. For instance, the first circuitry 104 may include at least a portion of datapath circuitry for the bus interface 100.

In this example, the first power supply bus 102 is coupled with a main power supply 110, such that the first power supply bus 102 may distribute a first power supply voltage that is provided by the main power supply 110. In the bus interface 100, the first power supply bus 102 may be energized (using the first power supply voltage provided by the main power supply 110) during a normal operating mode of the bus interface. Further, for the bus interface 100, the first power supply bus 102 may not be energized during a low power operating mode of the interface (e.g., the main power supply 110 may be turned off). In such an arrangement, the first circuitry 104 may draw substantially zero current in the low power operating mode (e.g., substantially no leakage or dynamic current).

In the bus interface 100, the second power supply bus 106 is coupled with a voltage switch 114. The voltage switch 114 may be used to selectively couple the second power supply bus 106 with the main power supply 110 or with an auxiliary power supply 112. The auxiliary power supply 112 may provide a second power supply voltage that is used to energize the second power supply bus 106 in the low power operating mode of the bus interface 100. Also, in like fashion as the first power supply bus 102, the main power supply 110 may be used to energize the second power supply bus 106 with the first power supply voltage in the normal operating mode. For instance, the voltage switch 114 may be used to selectively couple the main power supply 110 with the second power supply bus 106 during the normal operating mode of the bus interface and to selectively couple the auxiliary power supply 112 with the second power supply bus 106 in the low power operating mode.

It is noted that the terms "main" and "auxiliary" are given by way of example to distinguish power supply 110 from power supply 112. Any number of terms could be used to describe the power supplies 110 and 112 of the bus interface 100. For instance, the terms "primary" and "secondary" could be used, as one alternative. As another alternative, the power supplies could be referred to as a first power supply and a second power supply. As yet another alternative, the power supplies could be referred to as AC power and battery power.

In the bus interface 100, the second circuitry 108 includes a power management control circuit 116. In the low power operating mode, the power management control circuit 116 may be adapted to receive a power management event indication signal via a signal terminal 118. The power management control circuit 116 may be further adapted to, in response to the power management event indication signal, provide at least one of an in-band power management indication (not shown in FIG. 1A) and an out-of-band power management indication, via a signal terminal 120, to one or more devices in a computing system.

The power management control circuit 116 may implement any number of power management features. Such power management features may include functions or operations that the bus interface 100 supports when in the low power operating mode. Such power management features may include, as some examples, Wake-On-LAN features, link or cable detect features and OS absent management features. Such power management features may be implemented by a network interface card (NIC) or other device operating in a lower power operating mode (or in any other appropriate power state). Each of these power management features will now be briefly described.

Wake-On-LAN features may provide the ability of an interface (e.g., in a NIC) to keep an external (data network) connection active when in a low power operating mode to allow reception of network packets. Depending on the particular embodiment, such packets may be received at reduced data rates as compared with a normal operating mode. The interface may then examine the received packets to detect patterns within those packets. If a specific pattern is detected in a received packet, the interface may then send a signal to a computing system (system) that includes the interface. In response to this signal, the system may change its power state in response to the packet, or may, alternatively, process the packet in accordance with a network communication protocol implemented by the system. The signal sent in response to the detection of a specific pattern may be an in-band signal (e.g., sent over the data network or sent over the bus interface) or an out-of-band signal (e.g., sent over a dedicated interface in the system).

Link change or cable detect features may be used to change a system's power state based on acquiring or losing connection to a network. Link change or cable detect features may also be used to change the system's power state based on detecting connection or loss of connection of a cable to the system. As with the Wake-On-LAN features discussed above, the status change may be signaled to the system by the interface to cause the system to change its power-state based on the occurrence of such events.

OS absent management features are features of a system that may be implemented even when the system is not running an operating system or a user application. Depending on the particular embodiment, OS absent management features may be implemented when the system is in a low power operating mode (as well as a normal operating mode). Such features may allow for communication, over a data network, between a management entity within the system such as a Base Board Management Controller (BMC) and a management control application running on the system or another system. For instance, such communication may include a status of one or more aspects of the system (e.g., whether the cover is installed, the temperature at various locations within the system, power supply voltages, current power state of system, and status of software running on the system, as some examples). Based on this communication, the interface may signal the system to change its power state, such as in the manners described above.

The bus interface 100 further includes a communication link 122 that may be used for communicating signals between the first circuitry 104 and the second circuitry 108. Example embodiments of such a communication links are discussed in further detail below with reference to FIGS. 5-7. The bus interface 100 still further includes a communication link 124 that may be used for communicating signals (e.g., in accordance with a bus interface protocol) to and/or from other devices in a computing system. For instance, in a bus interface compliant with the PCIE specifications, the communication link 124 may include one or more data links or "lanes" (e.g., as described in the PCIE specifications) for communicating serial data.

Figure 1B:
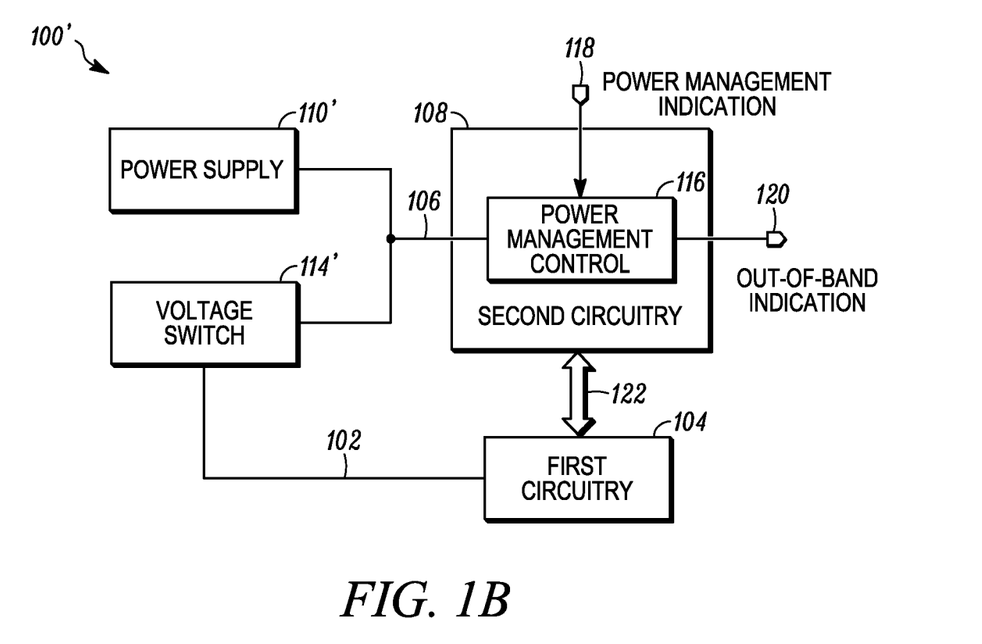
FIG. 1B is a schematic block diagram illustrating another example bus interface.

FIG. 1B is another schematic block diagram of an example embodiment of a bus interface 100'. The bus interface 100' includes analogous elements with the bus interface 100. The elements of the bus interface 100' that are substantially the same as the elements of the bus interface 100 are referenced with the same reference designators and are not discussed in detail again here, except to understand the differences between the bus interface 100' and the bus interface 100.

The bus interface 100' includes a single power supply 110' that is coupled with the second power supply bus 106 and a voltage switch 114'. The voltage switch 114' is also coupled with the first power supply bus 102. In the bus interface 100', the voltage switch 114' may be used to selectively couple and uncouple the power supply 110' with the first power supply bus 102 (e.g., to supply power to or remove power from the first circuitry 104) depending on whether the bus interface 100' is operating in a low power operating mode or a normal operating mode. By providing the capability to uncouple the power supply 110' from the first power supply bus 102, the leakage current of the first circuitry 104 may be eliminated. In such an implementation, the first power supply voltage and the second power supply voltage are provided by the single power supply 110'.

The bus interfaces 100 and 100' may be implemented using various semiconductor manufacturing processes, including advanced semiconductor manufacturing processes (e.g., with transistor dimensions of 90 nm or below). Of course, a number of other implementations are possible, such as board level circuit designs. Separation of such bus interfaces into first circuitry 104 and second circuitry 108, where the first circuitry 104 is powered off in a low power operating mode, allows circuitry not needed for implementing power management features to be included as part of the first circuitry 104. Such an approach may substantially reduce the amount of leakage current consumed by a bus interface when operating in a low power mode and allow such interfaces to meet low power operating mode current specifications.

Further, the bus interfaces 100 and 100' may take the form of a number of different types of bus interfaces. For instance, the bus interfaces 100 and 100' may be implemented as a PCI bus interface, a PCIE bus interface, a HyperTransport bus or an InfiniBand bus interface, as some examples. Alternatively, the bus interfaces 100 and 100' may take the form of any appropriate bus interface in which power management features are implemented in a low power operation mode.

Example PCI Express Bus Interfaces

Figure 2:
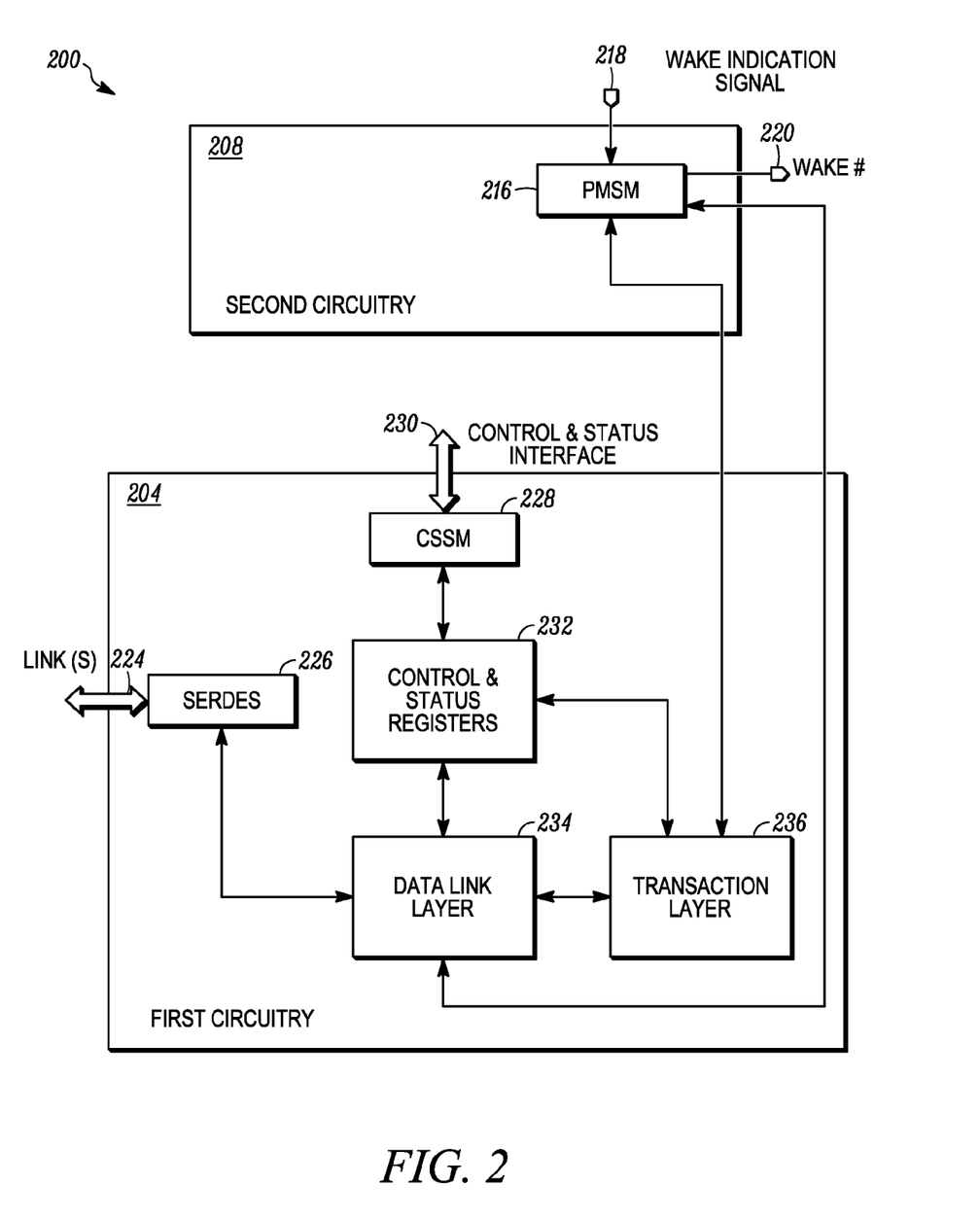
FIG. 2 is a schematic block diagram illustrating an example PCI Express bus interface.

FIG. 2 is a schematic block diagram of an example embodiment of a bus interface 200 implemented in accordance with the PCIE protocol. The PCIE protocol is known and will not be described in detail here. The PCIE protocol specifications are available from the PCI Special Interest Group (PCI-SIG), 3855 SW 153rd Drive, Beaverton, Oreg. 97006.

The bus interface 200, in similar fashion to the bus interfaces 100 and 100', includes first circuitry 204 and second circuitry 208. The first circuitry 204 and the second circuitry 208 may be provided with power as was described above with respect to FIGS. 1A and 1B. Alternatively, power may be applied to the first circuitry 204 and the second circuitry 206 in any other appropriate fashion that allows for providing power to the first circuitry 204 in a normal operating mode and removing power from the first circuitry 204 in a low power operating mode, while providing power to the second circuitry in both the normal operating mode and the low power operating mode.

In the bus interface 200, the power management control circuit includes a power management state machine (PMSM) 216, such as described in the PCIE specifications. As is also described in the PCIE specifications, the PMSM 216 includes logic to implement a power management event (PME) enable bit and a PME status bit. The PME enable bit may be used to indicate whether power management features are enabled or disabled in the bus interface 200. The PME status bit may be used to indicate whether a power management event (e.g., a power management event indication signal was received) has occurred in the bus interface 200.

The PMSM 216 may also include logic adapted to receive a wake indication signal via a signal terminal 218. Depending on the particular embodiment, the wake indication signal may be provided to the bus interface 200 in response to a Wake-On-LAN indication signal. Responsive to the wake indication signal, the PMSM 216 may generate a WAKE# signal (e.g.; an out-of-band power management indication) via a signal terminal 220. The WAKE# signal may be provided to one or more devices in a computing system in which the bus interface 200 is included. As was discussed above, the signal terminal 220 may be a dedicated interface (or part of a dedicated interface) that is used to communicate out-of-band signals related to power management features implemented by the second circuitry 208.

It will be appreciated, of course, that any number of other functions and/or logic may be included in the PMSM 216, as well as the second circuitry 208. Examples of such logic and features are described below with respect to FIGS. 3-7. Furthermore the wake indication signal and WAKE# signals are given by way of example and any number of signals related to power management features, such as link or cable detect features or OS absent management features, as were described above, may be used.

The first circuitry 204 of the bus interface 200 includes one or more links 224 (e.g., lanes) that may be used for communicating serial data between PCIE devices. The links 224 are coupled with a data serializer/de-serializer (SerDes) 226 that is used to convert serial data communicated to the bus interface 200 to parallel data, where the parallel data may be communicated within a system in which the bus interface 200 is implemented. The SerDes 226 may also be used to convert parallel data to serial data, where the bus interface 200 may communicate the resulting serial data to other PCIE devices over the links 224.

The first circuitry 204 further includes a control and status state machine (CSSM) 228, as is also described in the PCIE specifications. The CSSM 228 may be adapted to configure the bus interface 200 based on configuration information provided to the interface by an external device (e.g., a ROM) via a control and status interface 230. The CSSM 228 may store control and status information in one or more control and status registers 232 that are included in the first circuitry 204.

The first circuitry 204 further includes a datalink layer 234 and a transaction layer 236. In the bus interface 220, the SerDes 226, the datalink layer 234 and transaction layer 236 constitute at least a portion of datapath circuitry for the bus interface 200. For instance, the datalink layer 234 is coupled with the SerDes 226 (as well as the control and status registers 232). The datalink layer 226 may be adapted to sequence data packets communicated to and from the bus interface in accordance with control and status information included in the control and status registers 232. Further, the transaction layer 236 is coupled with the datalink layer 234 (as well as the control and status registers 232). In the bus interface 200, the transaction layer 236 may be adapted to frame and packetize data communicated by the bus interface 200. Of course, the operation of the datalink layer 234 and the transaction layer 236 may be implemented in accordance with the PCIE specifications.

It will be appreciated by those working in this area that the bus interfaces described herein also include a physical (PHY) layer. In the embodiments described herein, the PHY layer may have elements that are present in both the first circuitry and the second circuitry. Therefore, for purposes of clarity, the PHY layer is not explicitly shown in the drawings.

Figure 3:
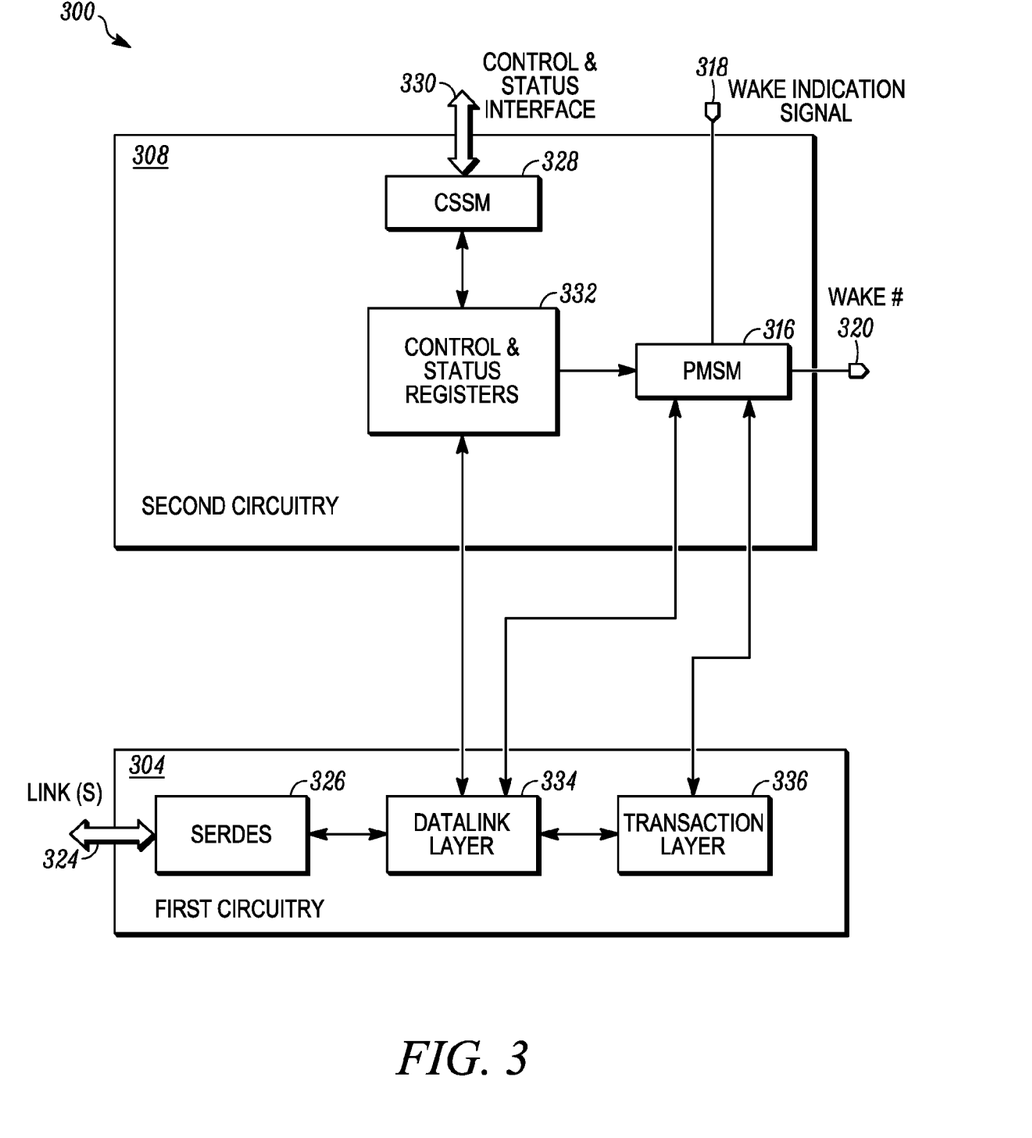
FIG. 3 is a schematic block diagram illustrating another example PCI Express bus interface.

FIG. 3 is a schematic block diagram of another example embodiment of a bus interface 300. As with the bus interface 200, the bus interface 300 may be implemented in accordance with the PCIE specifications. Elements in the bus interface 300 that are similar to elements of the bus interface 200 are referenced with 300 series reference numbers that correspond with the 200 series reference numbers of the bus interface 200 illustrated in FIG. 2. In similar fashion as the bus interface 200, second circuitry 308 of the bus interface 300 includes a PMSM 316. The PMSM 316 may be adapted to receive a wake indication signal via a signal terminal 318 and responsively provide a WAKE# signal to one or more devices in a computing system via a signal terminal 320. Of course, other signals related to power management features may be received by and/or provided to the PMSM 316 in addition to, or in place of the wake indication signal and the WAKE# signal. Furthermore, an in-band indication signal may be produced in addition to, or in place of the WAKE# signal.

For the bus interface 300, a CSSM 328 and corresponding control and status registers 332 are implemented as part of the second circuitry 308, instead of the first circuitry 304, as was the case for the bus interface 200 shown in FIG. 2. In such an arrangement, the CSSM 316 may be adapted to configure the bus interface 300 in a low power mode using information provided to the CSSM 328 via a control and status interface 330. Further, the configuration and status registers 332 may be adapted to retain configuration information and status information for the bus interface 300 on transitions of the interface between the low power mode, and the normal operating mode.

Because the CSSM 328 may; configure the bus interface 300 in the low power mode, the process of such configuration may not be timing critical (as may be the case with the bus interface 200). Therefore, the CSSM 328 and the control and status registers 332 may be implemented using high threshold transistors (e.g., slower transistors) and operated with a relatively slow clock signal, as compared to other portions of the bus interface 200. Such an approach may be advantageous because high threshold transistors consume substantially less leakage current than low threshold (e.g., fast transistors) in advanced semiconductor manufacturing processes. Accordingly, the CSSM 328 and the control and status registers 332 may consume very little leakage current, which may be advantageous in the bus interface 300 meeting the PCIE low power operating mode current requirement of 375 mA.

In like fashion as the bus interface 200, the first circuitry 304 of the bus interface 300 includes one or more links 324, a datalink layer 334 and a transaction layer 336. The links 324, the datalink layer 334 and the transaction layer 336 may operate in substantially the same fashion as described above for the analogous elements of the bus interface 200. Therefore, for the sake of clarity and brevity, these elements of the bus interface 300 are not described in detail again here.

Figure 4:
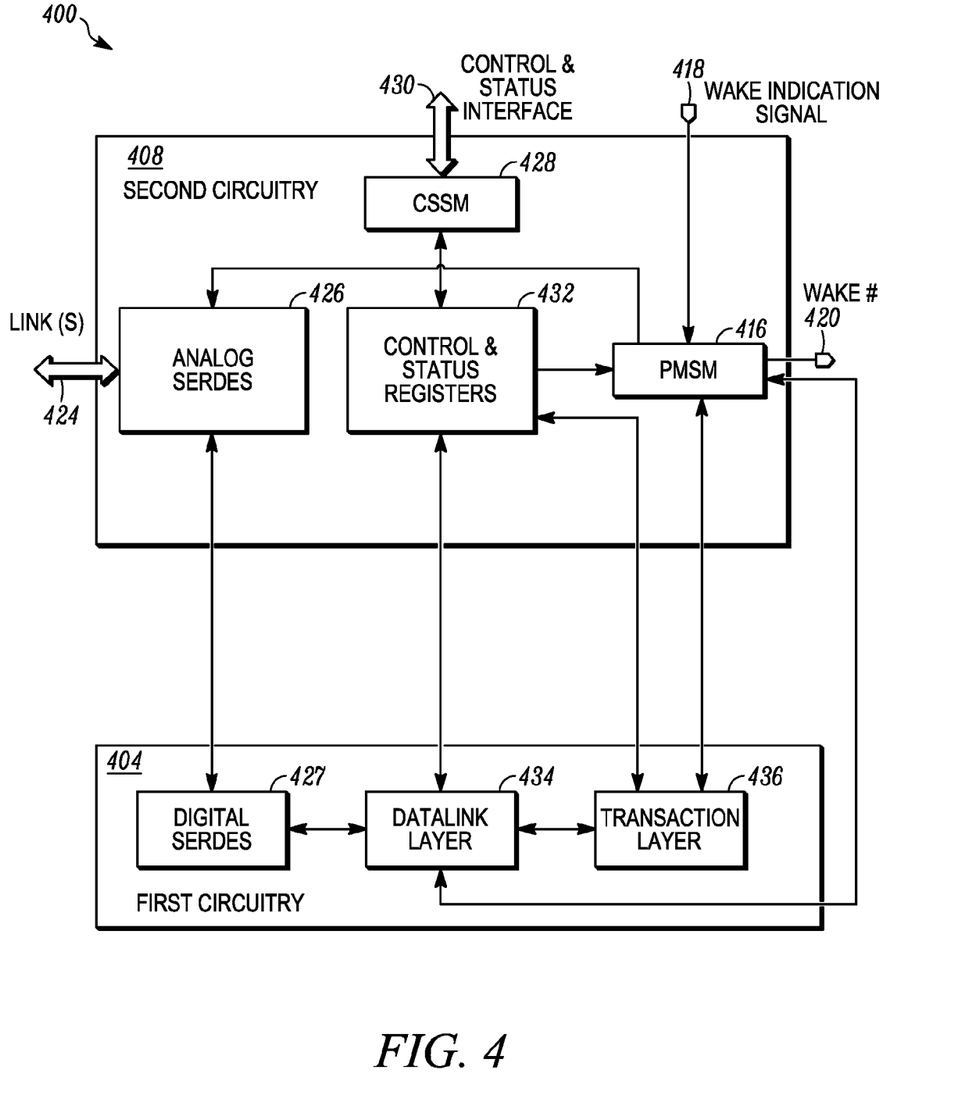
FIG. 4 is a schematic block diagram illustrating yet another example PCI Express bus interface.

FIG. 4 is a schematic block diagram that illustrates yet another example embodiment of a bus interface 400. As with the bus interfaces 200 and 300, the bus interface 400 may be implemented in accordance with the PCIE specifications. Like elements in the bus interface 400 are referenced with 400 series reference numbers that correspond with the 200 and 300 series reference numbers of the bus interfaces 200 and 300 illustrated in FIGS. 2 and 3, respectively. In like fashion as the bus interfaces 200 and 300, second circuitry 408 of the bus interface 400 includes a PMSM 416. The PMSM 416 may be adapted to receive a wake indication signal via a signal terminal 418 and responsively provide a WAKE# signal to one or more devices in a computing system via a signal terminal 420. Of course, other signals related to power management features may be received by and/or provided to the PMSM 416 in addition to, or in place of the wake indication signal and the WAKE# signal.

Also in like fashion with the bus interface 300, second circuitry 408 includes a CSSM 428 and corresponding control and status registers 432. As with the bus interface 300, the CSSM 416 may be adapted to configure the bus interface 400 in a low power mode using information provided to the CSSM 428 via a control and status interface 430. As with the bus interface 300, the configuration and status registers 432 of the bus interface 400 may be adapted to retain configuration information and status information for the bus interface 400 on transitions of the interface between the low power mode and the normal operating mode.

For the bus interface 400, the SerDes is divided into an analog SerDes 426 and a digital SerDes 427. The analog SerDes 426 is included in the second circuitry 408, while the digital SerDes 427 is included in the first circuitry 404. One or more data links 424 are coupled with the analog SerDes 424 for communicating serial data to and from the bus interface 400. The digital SerDes 427 converts data communicated via the bus interface 400 between serial data and parallel data, depending whether the data is being communicated to or from the interface.

In the bus interface 400, the PMSM 416 is coupled with the analog SerDes 426. In this example, the PMSM 416 may, in addition to providing the WAKE# signal to one more devices in a computing system, also provide a beacon stimulus signal (e.g., an in-band power management event indication) to the analog SerDes 426 in response to the wake indication signal received via the signal terminal 418. In response to the beacon stimulus signal, the analog SerDes 426 may provide a beacon signal via a lane 0 of the links 424 to one or more other PCIE interfaces. Such beacon signals are described in the PCIE specifications and are known to those working in this area.

Isolation Techniques

In bus interfaces, such as those described above with respect to FIGS. 1-4, powering down first circuitry in a low power mode may cause undesired results if the first circuitry is not isolated from the second circuitry in the low power mode. Such results include latch-up conditions that may occur as a result of signals from the second circuitry being communicated to the unpowered first circuitry. Such latch-up conditions may damage the interface circuitry and make it non-functional. Alternatively, signal lines from the first circuitry to the second circuitry may float, leading the second circuitry to believe that a signal from the first circuitry is switching. This may produce unexpected results and result in improper operation of the bus interface.

Figure 5:
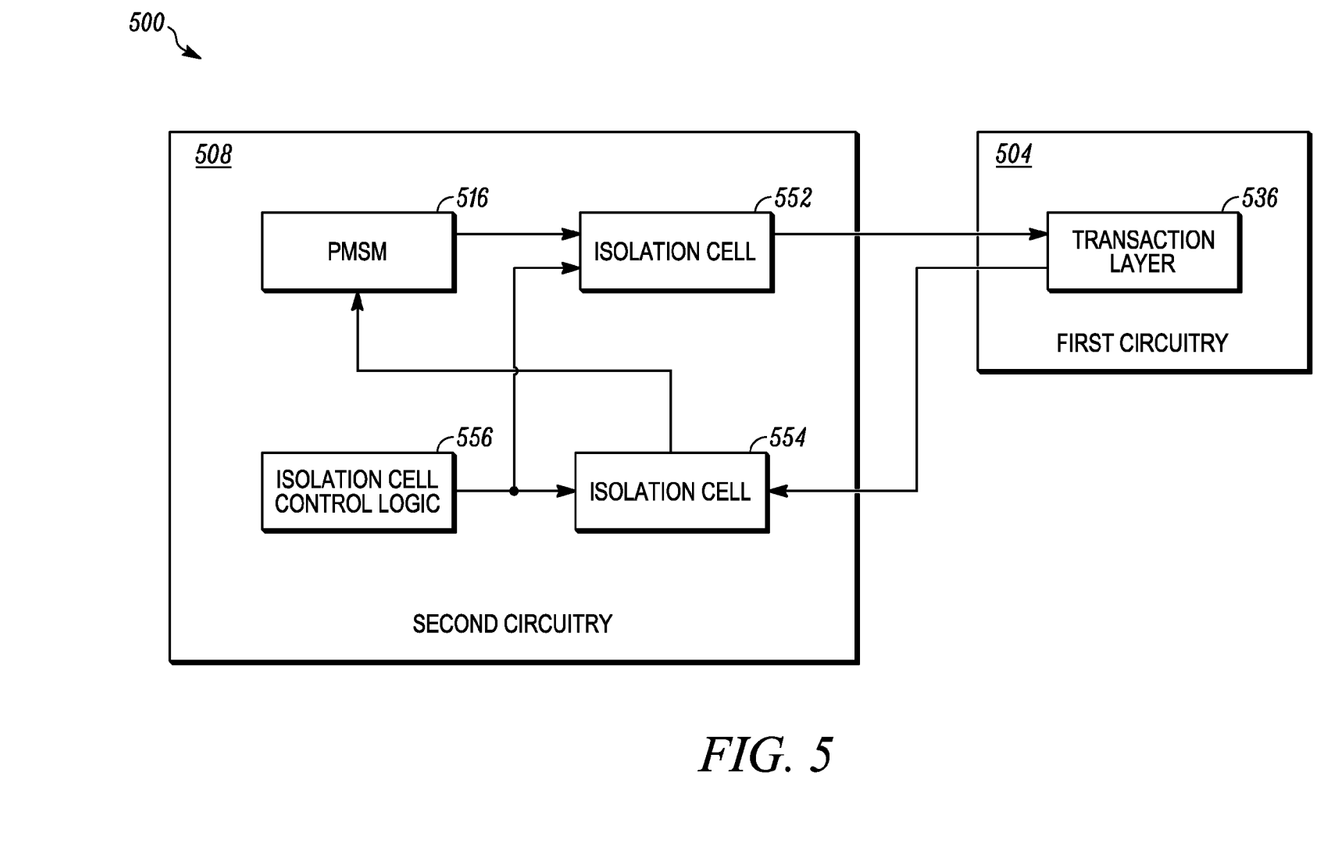
FIG. 5 is a schematic block diagram illustrating an example embodiment of a bus interface including isolation cells.

FIG. 5 is a schematic block diagram of a bus interface 500 that uses isolation cells to prevent such undesirable results. In like fashion as the bus interfaces described above with respect to FIGS. 1-4, the bus interface 500 includes first circuitry 504 and second circuitry 508. The first circuitry 504 includes a transaction layer 536 and the second circuitry 508 includes a PMSM 516. The transaction layer 536 and PMSM 516 are shown by way of example in FIG. 5 in order to illustrate the use of isolation cells. The isolation techniques described herein may be applied generally for signals communicated between the first circuitry and second circuitry of embodiments of bus interfaces as described herein.

The bus interface 500 further includes a first isolation cell 552 and a second isolation cell 554 that are coupled with the first circuitry 504 and the second circuitry 508 to isolate the first circuitry 504 from the second circuitry 508 in the low power mode (e.g., when no power is applied to the first circuitry 504). The isolation cells 552 and 554 are further coupled with isolation cell control logic 556, which may be used to enable the isolation cells 552 and 554, (e.g., to allow signals to be communicated via the isolation cells) in the normal operating mode and disable the isolation cells 552 and 554 (e.g., to prevent signals from being communicated via the isolation cells) in the low power operating mode. The isolation cell 552 prevents communication of signals from the second circuitry 508 to the first circuitry 504, while the isolation cell 554 prevents communication of signals (e.g., floating signals) from the first circuitry 504 to the second circuitry 508.

In certain embodiments, for example, the PMSM 516 may include logic adapted to provide signals to the isolation cell control logic 556 to cause the control logic 556 to enable and/or disable the isolation cells as appropriate. Alternatively, such logic may be included in a CSSM or some other portion of the bus interface 500.

Figure 6:
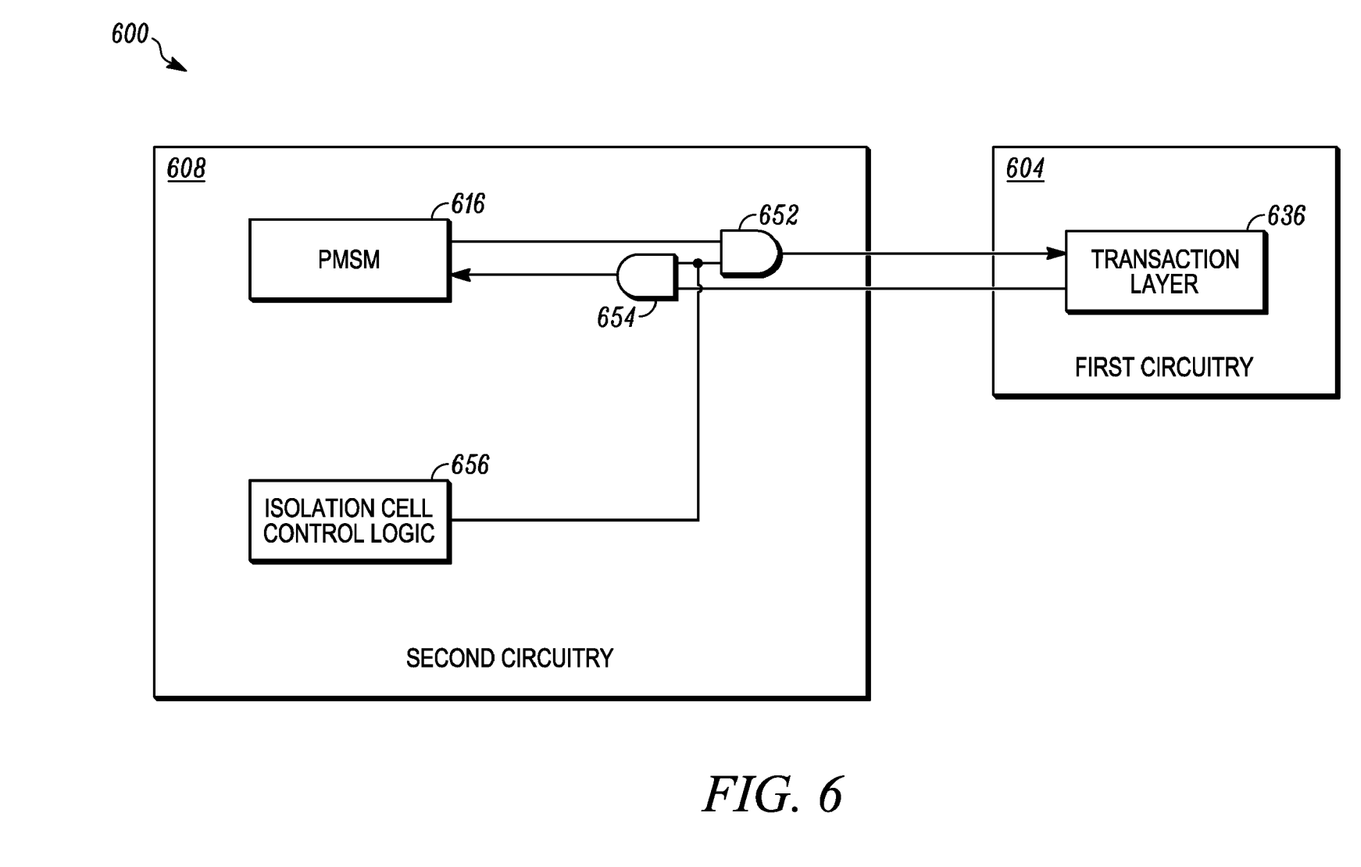
FIG. 6 is a schematic block diagram illustrating the use of AND gates as isolation cells in a bus interface.

FIG. 6 is a schematic block diagram of another example embodiment of a bus interface 600 including isolation cells. In the bus interface 600, the isolation cells take the form of AND gates 652 and 654. The bus interface 600, in like fashion as the bus interface 500, includes first circuitry 604 and second circuitry 608. The first circuitry 604 includes a transaction layer 636 and the second circuitry 608 includes a PMSM 616, which are shown by way of example to illustrate the example isolation technique.

The bus interface 600 further includes isolation cell control logic that may be used to control the AND gates 652 and 654 to prevent communication of signals (e.g., floating or otherwise) between the first circuitry 604 and the second circuitry 608 when the bus interface 600 is operating in a low power operating mode (e.g., the first circuitry 604 is powered off). For instance, the PMSM 616 may provide a signal to the isolation cell control logic 656 indicating that the bus interface 600 is operating in the low power operating mode. Responsively, the isolation cell control logic 656 may assert a digital zero '0' on a single input of each of the AND gates 652 and 654, which would prevent the AND gates from communicating any signals presented to the other input terminal of the AND gates 652 and 654, thus isolating the first circuitry 604 from the second circuitry 608.

When the bus interface 600 is operating in the normal operating mode, the PMSM 616 may provide a signal to the isolation cell control logic 656 to indicate that the bus interface 600 is operating in the normal mode. Responsively, the isolation cell control logic 656 may assert a digital one '1' on a single input of each of the AND gates 652 and 654, which would result in the AND gates 652 and 654 behaving as signal buffers, thus allowing signals to be communicated between the first circuitry 604 and the second circuitry 608.

Figure 7:
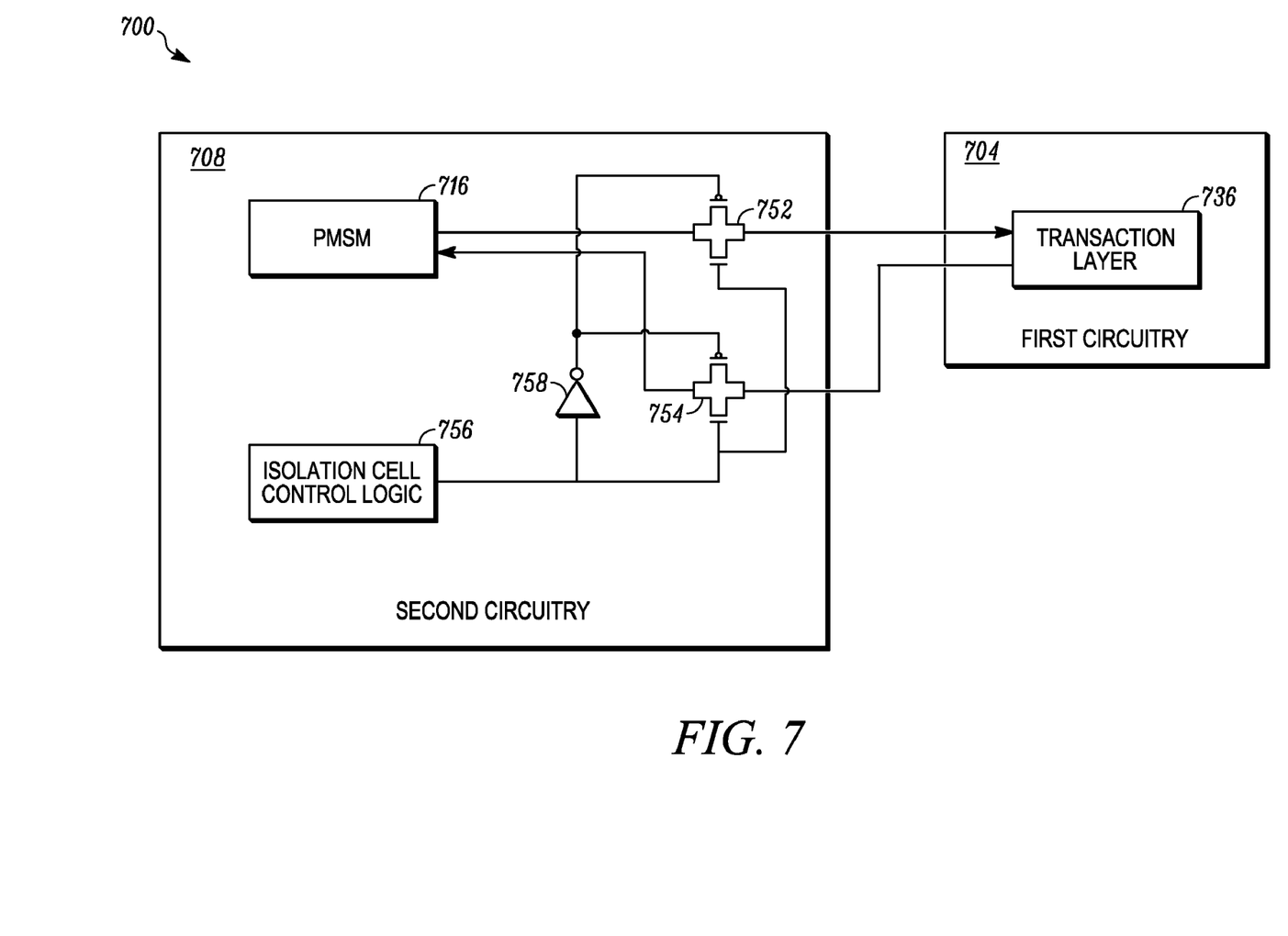
FIG. 7 is a schematic block diagram illustrating the use of CMOS transmission gates as isolation cells in a bus interface.

FIG. 7 is a schematic block diagram of yet another example embodiment of a bus interface 700 including isolation cells. In the bus interface 700, the isolation cells take the form of CMOS transmission gates 752 and 754. The bus interface 700, in like fashion as the bus interfaces 500 and 600, includes first circuitry 704 and second circuitry 708. The first circuitry 704 includes a transaction layer 736 and the second circuitry 708 includes a PMSM 716, which are shown by way of example to illustrate the example isolation technique.

The bus interface 700 further includes isolation cell control logic 756 that may be used to control the transmission gates 752 and 754 to prevent communication of signals (e.g., floating or otherwise) between the first circuitry 704 and the second circuitry 708 when the bus interface 700 is operating in a low power operating mode (e.g., the first circuitry 704 is powered off). For instance, the PMSM 716 may provide a signal to the isolation cell control logic 756 indicating that the bus interface 700 is operating in the low power operating mode. Responsively, the isolation cell control logic 756 may assert a digital zero '0' on its; output signal terminal. This digital zero may then be applied to the gates of the NMOS transistors of the transmission gates 752 and 754, shutting those transistors off. The digital zero asserted on the output signal terminal of the isolation cell control logic 756 is inverted to a digital one '1' by an inverter 758. The digital one may then be applied to the gates of the PMOS transistors of the CMOS transmission gates 752 and 754, also shutting off those transistors, thus preventing the transmission gates 752 and 754 from communicating any signals between the first circuitry 704 and the second circuitry 708.

When the bus interface is operating in the normal operating mode, the PMSM 716 may provide a signal to the isolation cell control logic 756 to indicate that the bus interface 700 is operating in the normal mode. Responsively, the isolation cell control logic may assert a digital one '1' on its output terminal, which would result in the transistors of the transmission gates 752 and 754 being turned on and, thus, allowing signals to be communicated between the first circuitry 704 and the second circuitry 708.

Example Method for Providing a Bus Interface

Figure 8:
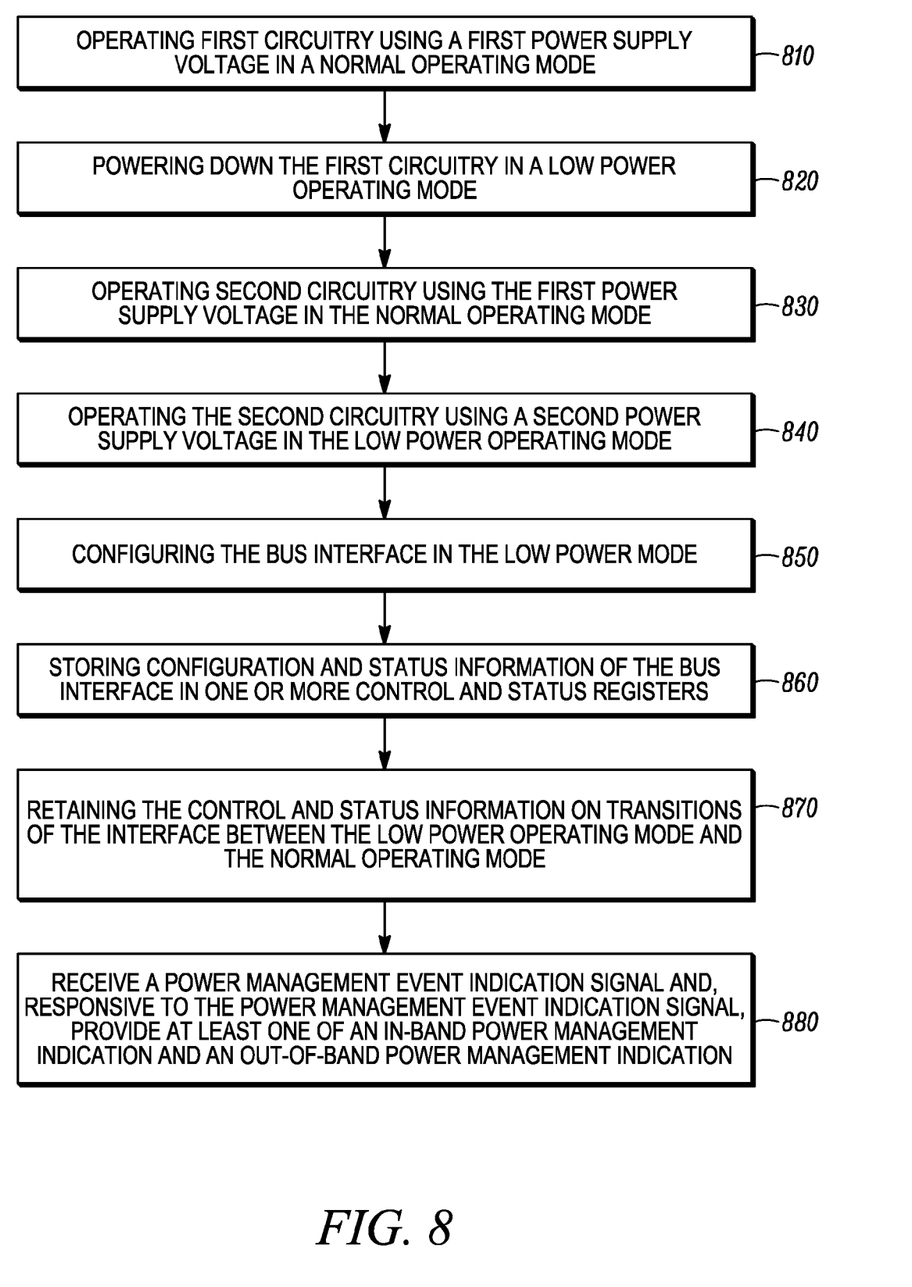
FIG. 8 is a flowchart illustrating an example method of providing a bus interface.

FIG. 8 is a flowchart of an example method 800 for providing a bus interface. The method 800 may be implemented, for example, in the bus interfaces described herein. The method 800 includes, at block 810, operating first circuitry using a first power supply voltage in a normal operating mode. In the method 800 the first circuitry may include at least a portion of datapath circuitry of the bus interface. At block 820, the method 800 includes powering down the first circuitry in a low power operating mode, such as described above. At block 830, the method 800 includes operating second circuitry using the first power supply voltage in the normal operating mode. At block 840, the method 800 includes operating the second circuitry using a second power supply voltage in the low power operating mode.

The method 800 further includes, at block 850, configuring the bus interface in the low power mode, at block 860, storing configuration and status information of the bus interface in one or more control and status registers included in the second circuitry and, at block 870, retaining the control and status information on transitions of the interface between the low power operating mode and the normal operating mode, such as was discussed above with respect to FIG. 3.

In this example method, the second circuitry may include a power management control circuit. The power management control circuit may be adapted to receive, at block 880, a power management event indication signal and, responsive to the power management event indication signal, provide at least one of an in-band power management indication and an out-of-band power management indication to one or more devices in a computing system, such as in the manners discussed above.

In the example method, the first and second circuitry may be isolated using isolation cells, such as were described above with respect to FIGS. 5-7. For instance, AND gates or transmission gates included in the second circuitry may be used to isolate the first circuitry from the second circuitry.

Other Implementations

While a number of aspects and embodiments have been discussed above, it will be appreciated that various modifications, permutations, additions and/or sub-combinations of these aspects and embodiments are possible. It is therefore intended that the following appended claims and claims hereafter introduced are interpreted to include all such modifications, permutations, additions and/or sub-combinations as are within their true spirit and scope.

What is claimed is:

1. A bus interface comprising:
a first power supply bus adapted to distribute a first power supply voltage, wherein the first power supply bus is adapted to be energized during a normal operating mode of the bus interface and the first power supply bus is adapted to be not energized during a low power operating mode of the interface;
a second power supply bus adapted to distribute the first power supply voltage during the normal operating mode and distribute a second power supply voltage during the low power operating mode;
first circuitry coupled with the first power supply bus; and
second circuitry coupled with the second power supply bus,
wherein:
the first circuitry and the second circuitry are adapted to be powered using the first power supply voltage in the normal operating mode;
the first circuitry is adapted to be powered down in the low power operating mode;
the second circuitry is adapted to be powered by the second power supply voltage in the low power operating mode;
the first circuitry comprises at least a portion of datapath circuitry of the bus interface; and
the second circuitry comprises a power management control circuit adapted to, in the low power operating mode, receive a power management event indication signal and, responsive to the power management event indication signal, provide at least one of an in-band power management indication and an out-of-band power management indication to one or more devices in a computing system.

2. The bus interface of claim 1, wherein the first power supply voltage and the second power supply voltage are provided using a single voltage source.

3. The bus interface of claim 1, wherein the power management control circuit comprises a power management state machine (PMSM), the PMSM comprising:
circuitry adapted to provide a power management event (PME) enable bit;
circuitry adapted to provide a PME status bit; and
circuitry adapted to receive a wake indication signal and, responsive to the wake indication signal, generate a WAKE# signal, the WAKE# signal being an out-of-band power management indication.

4. The bus interface of claim 3, wherein the wake indication signal is provided to the bus interface in response to a Wake-On-LAN indication signal.

5. The bus interface of claim 1, wherein the second circuitry further includes an analog section of a serializer/de-serializer (analog SerDes) coupled with the power management control circuit, wherein the analog SerDes is adapted to:
receive a beacon stimulus signal from the power management control circuit, the beacon stimulus signal being provided in response to the power management event indication signal; and
responsive to the beacon stimulus signal, providing a beacon signal to at least one other bus interface, the beacon signal being provided via one or more data link lanes between the bus interfaces.

6. The bus interface of claim 1, wherein the second circuitry further comprises:
a control and status state machine (CSSM) adapted to configure the interface based on configuration information provided to the interface by an external device; and
one or more control and status registers for storing and maintaining the configuration information and status information for the interface.

7. The bus interface of claim 6, wherein the CSSM is further adapted to configure the interface in the low power mode, and wherein the configuration information and the status information are retained by the control and status registers on transitions of the interface between the low power operating mode and the normal operating mode.

8. The bus interface of claim 1, wherein the interface comprises CMOS circuitry.

9. The bus interface of claim 1, wherein the first circuitry comprises:
a digital section of a serializer/de-serializer (digital SerDes) adapted to convert serial data communicated to the interface to parallel data;
a datalink layer coupled with the digital SerDes, the datalink layer being adapted to sequence data packets communicated to and from the bus interface; and
a transaction layer coupled with the datalink layer, the transaction layer being adapted to frame and packetize data communicated by the bus interface.

10. The bus interface of claim 1, wherein the second circuitry comprises isolation cells, and wherein signals communicated between the first circuitry and the second circuitry are communicated via the isolation cells.

11. The bus interface of claim 10, wherein the isolation cells each comprise an AND gate and wherein the second circuitry further comprises isolation cell control logic coupled with the isolation cells, the isolation cell control logic being adapted to apply a digital '1' to a single input terminal of each AND gate in the normal operating mode and to apply a digital '0' to the single input terminal of each AND gate in the low power operating mode.

12. The bus interface of claim 10, wherein the isolation cells each comprise a transmission gate and wherein the second circuitry further comprises isolation cell control logic coupled with the isolation cells, the isolation cell control logic being adapted to enable the transmission gates of the isolation cells in the normal operating mode and disable the transmission gates of the isolation cells in the low power operating mode.

13. The bus interface of claim 1, wherein a voltage switch selectively couples a first power supply to the second power supply bus in the normal operating mode and couples a second power supply to the second power supply bus in the low power operating mode.

14. A method comprising:
operating first circuitry of a bus interface using a first power supply voltage in a normal operating mode, the first circuitry comprising at least a portion of datapath circuitry of the bus interface;
powering down the first circuitry into a low power operating mode;
operating second circuitry of the bus interface using the first power supply voltage in the normal operating mode;
operating the second circuitry using a second power supply voltage in the low power operating mode;
receiving a power management event indication signal at the second circuitry; and
in response to the power management event indication signal, providing at least one of an in-band power management indication and an out-of-band power management indication to one or more devices in a computing system coupled to the bus interface.

15. The method of claim 14, further comprising:
providing the first power supply voltage and the second power supply voltage from a single voltage source.

16. The method of claim 14, wherein receiving a power management event indication signal, and providing at least one of an in-band power management indication and an out-of-band power management indication comprises:
receiving a wake indication signal; and
responsive to the wake indication signal, providing at least one of a WAKE# signal to one or more devices in a computing system and providing a beacon stimulus signal to a data serializer/de-serializer (SerDes), wherein the SerDes is adapted to produce a beacon signal in response to the beacon stimulus signal.

17. The method of claim 14, further comprising:
configuring the bus interface in the low power mode;
storing configuration and status information of the bus interface in one or more control and status registers included in the second circuitry; and
retaining the control and status information on transitions of the interface between the low power operating mode and the normal operating mode.

18. The method of claim 14, further comprising isolating the first circuitry from the second circuitry using isolation cells, wherein signals communicated between the first circuitry and the second circuitry in the normal operating mode are communicated via the isolation cells and the isolation cells prevent communication of signals between the first circuitry and the second circuitry in the low power operating mode.

19. A PCI Express (PCIE) interface comprising:
a first power supply bus adapted to distribute a first power supply voltage, wherein the first power supply bus is adapted to be energized during a normal operating mode of the interface and the first power supply bus is adapted to be not energized during a low power operating mode of the interface;
a second power supply bus adapted to distribute the first power supply voltage during the normal operating mode and distribute a second power supply voltage during the low power operating mode;
first circuitry coupled with the first power supply bus; and
second circuitry coupled with the second power supply bus,
wherein:
the first circuitry and the second circuitry are adapted to be powered using the first power supply voltage in the normal operating mode;
the first circuitry is adapted to be powered down in the low power operating mode;
the second circuitry is adapted to be powered by the second power supply voltage in the lower power operating mode;
the first circuitry comprises at least a portion of datapath circuitry of the bus interface; and
the second circuitry comprises:
a power management state machine (PMSM), the PMSM comprising:
a power management event (PME) enable bit;
a PME status bit; and
logic adapted to receive a wake indication signal and, responsive to the wake indication signal, generate at least one of a WAKE# signal and a beacon stimulus signal;
a control and status state machine adapted to configure the bus interface based on configuration information provided to the bus interface;
one or more control and status registers for storing and maintaining the configuration information-and status information for the bus interface; and
an analog serializer/de-serializer (SerDes) coupled with the PMSM, the analog SerDes adapted to:
receive a beacon stimulus signal from the PMSM, the beacon stimulus signal being provided in response to a wake indication signal; and
responsive to the beacon stimulus signal, providing a beacon signal to at least one other PCI Express interface, the beacon signal being provided via a lane 0 link between the PCI Express interfaces.

20. The PCIE interface of claim 19, wherein the first power supply voltage and the second power supply voltage are provided using a single voltage source.

* * * * *